United States Patent [19]
Calvert

[11] 3,849,721
[45] Nov. 19, 1974

[54] MICROWAVE LOGGING APPARATUS HAVING DUAL PROCESSING CHANNELS

[75] Inventor: Thomas J. Calvert, Norwalk, Conn.

[73] Assignee: Schlumberger Technology, New York, N.Y.

[22] Filed: Aug. 23, 1973

[21] Appl. No.: 390,989

[52] U.S. Cl. .................................................. 324/6
[51] Int. Cl. ........................... G01v 3/12, G01v 3/18
[58] Field of Search ............................... 324/1, 6–8

[56] References Cited
UNITED STATES PATENTS

| | | | |
|---|---|---|---|
| 2,139,460 | 12/1938 | Potapenko .......................... | 324/6 X |
| 2,455,941 | 12/1948 | Muskat et al. ....................... | 324/6 |
| 2,790,138 | 4/1957 | Poupon ............................... | 324/6 |
| 2,880,389 | 3/1959 | Ferre et al. ......................... | 324/1 |
| 2,900,595 | 8/1959 | Mengel et al. ...................... | 324/8 X |
| 3,551,797 | 12/1970 | Gouilloud et al. ................... | 324/6 |

Primary Examiner—Gerard R. Strecker
Attorney, Agent, or Firm—Martin Novak et al.

[57] ABSTRACT

An apparatus for investigating, with propagating microwave electromagnetic energy, earth formations surrounding a borehole. In accordance with the invention there are provided first and second spaced transmitter means for injecting microwave electromagnetic energy into the surrounding formations. Switching means are provided for alternately energizing the transmitter means. First and second spaced receiver means are positioned between the transmitter means on a substantially common axis therewith. A first processing channel which includes first frequency translating means and first amplifying means receives microwave output signals from the first receiving means, translates the frequency of these signals to a sub-microwave frequency, and amplifies the translated signals to produce a first processed signal. A second processing channel which includes second frequency translating means and second amplifying means, receives microwave signals from said second receiving means, translates the frequency of these signals to a sub-microwave frequency and amplifies the translated signals to produce a second processed signal. Means are provided for comparing the phases of the first and second processed signals and for generating a first output which reflects the comparisons. Also, means synchronized with the switching means are provided for reversing the sense of the comparison performed by the comparing means. The disclosed apparatus is capable of accurately performing attenuation and phase comparisons on the microwave energy which has passed through the earth formations. Also, the duplication of processing channels combined with an averaging technique is judiciously utilized to cancel the effects of amplifier drift and processing instabilities so that accurate operation can be achieved, even under relatively adverse conditions.

7 Claims, 3 Drawing Figures

MICROWAVE LOGGING APPARATUS HAVING DUAL PROCESSING CHANNELS

BACKGROUND OF THE INVENTION

This invention relates to the investigation of earth formations with electromagnetic energy and, more particularly, to an improved apparatus which measured the propagation of such energy in earth formations.

In the copending U.S. application of R. Rau entitled "METHOD AND APPARATUS FOR INVESTIGATING EARTH FORMATIONS," Ser. No. 390,987, filed of even date herewith and assigned to the same assignee as the present application, there is disclosed a technique for injecting microwave electromagnetic energy into earth formations and then taking measurements which relate to the propagation of the energy through the formations. The propagation characteristics can be used to obtain, among other things, the dielectric constant associated with the formations. Briefly, a transmitting antenna is mounted in a wall-engaging pad of a well logging tool. Transmitted energy establishes a lateral wave which travels in the formations adjacent the interface between the mudcake and the formations. A pair of spaced receiving antennas are also mounted in the pad in an arrangement whereby they receive in succession the wave energy from the transmitter. This is known as a "differential receiver" arrangement since the difference in the pathlength (from the transmitter) between the energy received at the far receiver and the energy received at the close receiver is approximately equal to the distance between the receivers. The phase difference between the signals arriving at the first and second receiving antennas is measured. Also measured is the relative attenuation as between signals which arrive at the two receiving antennas. The loss-corrected dielectric constant associated with the formations surrounding the area between the first and second receiving locations can then be obtained by judiciously combining the phase and attenuation measurements.

The theory underlying the manner in which the phase and attenuation measurements can be utilized to advantage is described in detail in the above-referenced application, as is the manner in which the lateral wave is established in the formations. There are, however, serious problems which arise in attempting to extract the desired phase and attenuation information from the microwave signals received at the two spaced receivers. First of all, only a small portion of the signal energy from the transmitter arrives at the receivers, and the signal portions which do arrive have been attenuated during propagation through the formations. Therefore, the processing circuitry must deal with low level signals. Secondly, it is necessary to monitor the difference in phase between microwave signals which arrive at receivers that are relatively close together, typically 4 centimeters. At the encountered propagation velocities (which vary with the dielectric constant of the formations), the difference in arrival time at the two receivers is very short, typically of the order of 10 nanoseconds. This means that the phase detection portion of the processing circuitry has little room for error.

The listed constraints on the processing circuitry are all the more difficult since the primary detection tasks need be performed within a well logging device which is thousands of feet below the surface and which experiences varying adverse conditions of temperature and pressure. It would be most convenient if the signals from the receivers could be merely sent via conductors to the surface for processing. Obviously, though, the losses, distortions, and delays associated with a long cable render this an impractical alternative. Thus, processing must be performed within the logging device where environmental variations, especially temperature, may have an effect on solid state amplifiers, modulators, and the like.

To further understand the encountered processing problems, assume momentarily that a viable technique was available for comparing the relative phase and amplitudes of the microwave signals at the two receivers. In simplified terms, each of the received signals, being low level, could be amplified and then the two amplified signals could be coupled to both an amplitude comparator and to a phase comparator which would generate the desired outputs. Clearly, any relative instability of gain or phase as between the two amplifiers would disturb the ultimate amplitude and phase determinations. Over a period of time it is unlikely that two separate amplifiers would exhibit the same gain and/or phase drift, so inaccuracies in the attenuation and phase determinations could normally be expected. Such inacuracies are especially serious when processing weak signals of ultra high frequency.

A further difficulty to be dealt with in the type of logging device under consideration arises when the well bore surface is irregular. It was noted above that a differential receiver system with a single transmitter, sometimes called a "T-R-R" system, can yield information which relates approximately to the formations surrounding the area between the receivers. Ideally, the measurements should reflect only the effects on the wave energy experienced during the wave propagation through the formations, and not effects encountered during travel from the device to and from the formations (i.e., through mud, mudcake, etc.). On a perfectly regular surface having a mudcake of uniform thickness, the effects of travel from the formations to each receiver of a T-R-R system will be the same and will cancel during processing. On an irregular surface or one with varying mudcake thickness, however, the transit path from formation to receiver may be different for the two receivers and result in a disturbance of the measurements.

The last-mentioned problem has been essentially solved in the case of an acoustic logging device by providing two transmitters on opposite sides of the two receivers, an arrangement now known as "T-R-R-T." The technique is disclosed in U.S. Pat. No. 3,257,639 wherein pulses of acoustic energy are alternately transmitted from two transmitters designated $T_1$ and $T_2$. A pair of receivers, designated $R_1$ and $R_2$, are each coupled through a solenoid-controlled switch to a single amplification channel and then to a counter. The solenoid is controlled such that each receiver is "active" (i.e., coupled to the amplification channel) during half of the output pulses from each transmitter. The counter effectively counts the time that it takes for a transmitted pulse of acoustic energy to travel from each transmitter to each receiver. For example, assume that the lengthwise arrangement is designated as $T_1$-$R_1$-$R_2$-$T_2$. With respect to $T_1$, $R_1$ is the "close" receiver and $R_2$ is the "far" receiver while with respect to $T_2$, $R_2$ is the "close" receiver and $R_1$ is the "far" receiver. A full cycle of four pulses consists of two pulses transmitted by $T_1$ and two pulses transmitted by $T_2$. Each receiver is "active" for one of the pulses from each transmitter, so the four paths can be designated as "$T_1R_1$," "$T_1R_2$," "$T_2R_1$," and "$T_2R_2$." The counter is controlled to count up when a close receiver is active and to count down when a far receiver is active. The net count for a cycle therefore represents the travel time over the path $T_1R_1 + T_2R_2 - T_1R_2 - T_2R_1$. It can be readily demonstrated that the net count represents twice the transit time through the formations surrounding the area between the two receivers. The travel times between the formations and each receiver can be shown to cancel out, so a true measure of travel exclusively through the formations is obtainable.

The existence of a technique which solves one of the stated problems in the context of acoustic logging leaves remaining unsolved problems which can be summarized as follows:

a. How can a T-R-R-T type of system be applied to an apparatus utilizing microwave frequencies?

b. How can attenuation and phase comparisons be accurately performed at microwave frequencies?

c. How can the discussed problem of amplifier drift and processing instabilities be overcome in an apparatus operating with propagating microwave energy?

It is an object of the present invention to provide an apparatus which offers satisfactory solution to these problems.

SUMMARY OF THE INVENTION

The present invention is directed to an apparatus for investigating, with propagating microwave electromagnetic energy, earth formations surrounding a borehole. In accordance with the invention there are provided first and second spaced transmitter means for injecting microwave electromagnetic energy into the surrounding formations. Switching means are provided for alternately energizing the transmitter means. First and second spaced receiver means are positioned between the transmitter means on a substantially common axis therewith. A first processing channel, which includes first frequency translating means and first amplifying means, receives microwave output signals from the first receiving means, translates the frequency of these signals to a submicrowave frequency, and amplifies the translated signals to produce a first processed signal. A second processing channel, which includes second frequency translating means and second amplifying means, receives microwave signals from said second receiving means, translates the frequency of these signals to a sub-microwave frequency and amplifies the translated signals to produce a second processed signal. Means are provided for comparing the phases of the first and second processed signals and for generating a first output which reflects the comparisons. Also, means synchronized with the switching means are provided for reversing the sense of the comparison performed by the comparing means.

In the preferred embodiment of the invention there is further provided means for averaging the output of the phase comparing means over a period of a plurality of cycles of the switching means. In this embodiment, there is further provided means for comparing the amplitudes of the first and second processed signals and for generating a second output which reflects this amplitude comparison. Means synchronized with the switching means are also provided for reversing the sense of the amplitude comparison performed by the amplitude comparing means.

As will become clear, the disclosed apparatus is capable of accurately performing attenuation and phase comparisons on the microwave energy which has passed through the earth formations. Also, the duplication of processing channels combined with an averaging technique is judiciously utilized to cancel the effects of amplifier drift and processing instabilities so that accurate operation can be achieved, even under relatively adverse conditions.

Further features and advantages of the invention will become more readily apparent from the following detailed description when taken on conjunction with the accompanying drawings.

DESCRIPTION OF THE PREFERRED EMBODIMENT

Figure 1:
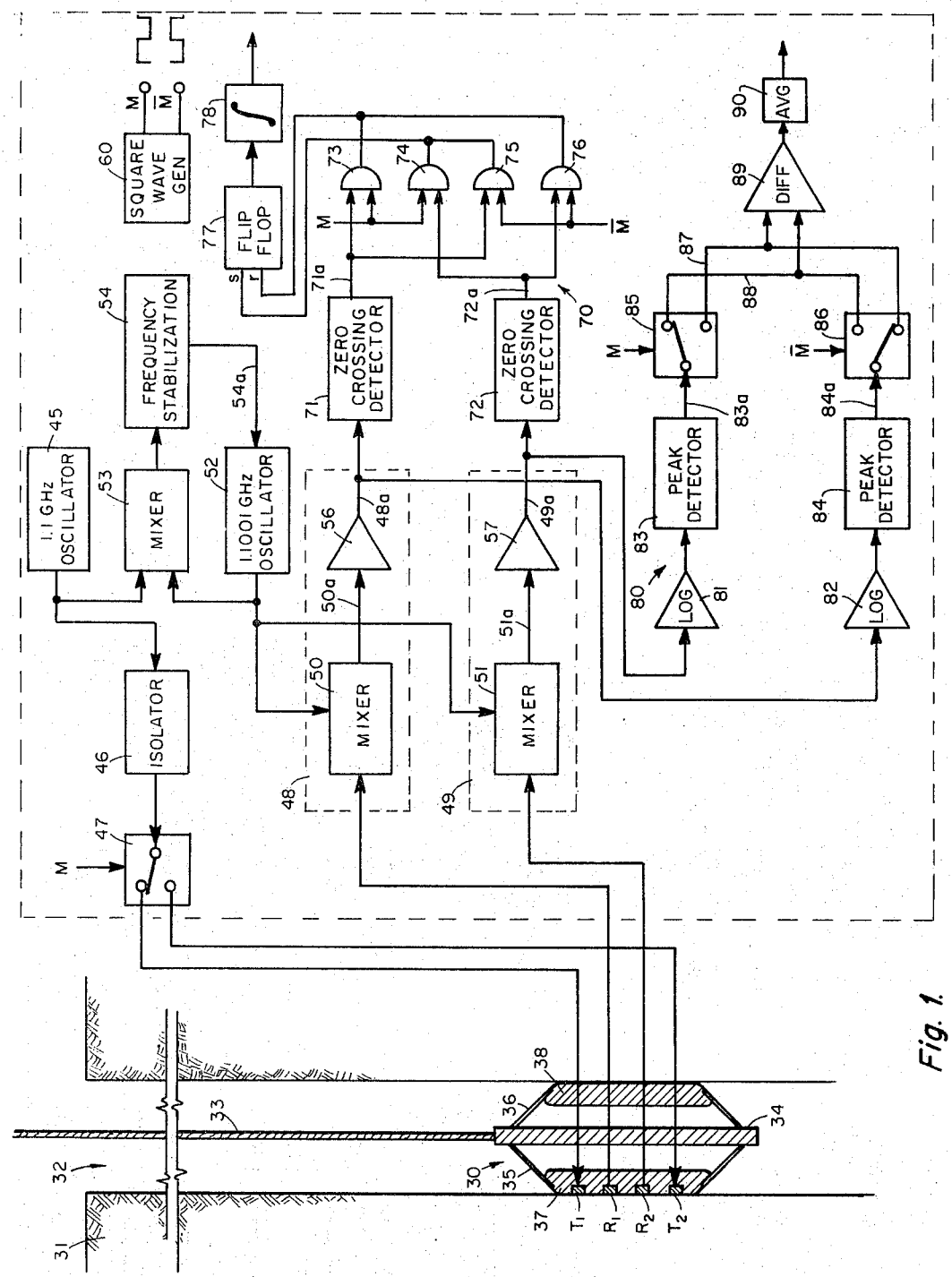
FIG. 1 is a schematic representation, partially in block diagram form, of an apparatus in accordance with an embodiment of the invention.

Before describing the structural features of the preferred embodiment, it is helpful to review some of the theoretical considerations disclosed in the above-referenced copending application of Rau. This will allow an understanding of some of the reasons for wanting to obtain information about certain characteristics of microwave energy propagating in earth formations.

Prior investigators have recognized that the dielectric constant of the different materials of earth formations vary widely (e.g., 2.2 for oil, 7.5 for limestone and 80 for water) and that the measurement of dielectric properties therefore holds promise of being a useful means of formation evaluation. The dielectric constant of a lossy material can be expressed as a complex quantity of the form $$\epsilon^* = \epsilon' + j\epsilon''$$

The real part $\epsilon'$ in this equation represents the "true" dielectric constant of the material in lossless form; i.e., the measure of the displacement currents for a particular electric field in the material if it were lossless. The imaginary part $\epsilon''$ represents the "loss factor" of the material; i.e., the losses due to conduction and relaxation effects. The primary effort is concerned with determining the value of $\epsilon'$ for a particular portion of subsurface formation. This $\epsilon'$ will be subsequently referred to as simply $\epsilon$ without a superscript.

Consider a plane electromagnetic wave propagating in a lossless dielectric medium. The wave propagates with a velocity $$v = 1/\sqrt{\mu\epsilon}$$

1.

where $\mu$ is the magnetic permeability and $\epsilon$ the dielectric constant of medium. If the type of materials under consideration are generally non-magnetic, $\mu$ can be considered as a known constant and $\epsilon$ can be determined from the relationship $$\epsilon = 1/\mu v^2. \quad (1)$$

Next, consider two points in fixed space relation along the direction of propagation of the wave. For a given angular frequency, $\omega$, the phase difference of the wave as between the two points is $$\phi = \omega L/v = \beta L \quad (2)$$

where L is the distance separating the two points and $\beta$ is the phase constant of the wave as defined by $\beta = \omega/v$. Substituting from equation (1) it is seen that $\epsilon$ can be obtained after determination of the phase constant from the relationship $\beta = \omega\sqrt{\mu\epsilon}$ as $$\epsilon = \beta^2/\omega^2\mu. \quad (3)$$

In terms of the phase measured between two points the appropriate expression is $$\epsilon = \phi^2/\omega^2 L^2 \mu. \quad (4)$$

The preceding relationships are valid for lossless material, but subsurface media of interest generally have appreciable conductivity. The propagation constant, $\gamma$, of a plane electromagnetic wave propagating in a lossy medium is a complex quantity of the form $$\gamma = \omega\sqrt{\mu\epsilon}\sqrt{1 + j\sigma/\omega\epsilon} \quad (5)$$

where $\sigma$ is the conductivity of the medium. In a case where $\sigma$ is zero or very small the term $\sigma/\omega\epsilon$, known as the "loss tangent," can be neglected and we have $\gamma \approx \epsilon \approx \omega\sqrt{\mu\epsilon}$ which is consistent with equation (3) for the lossless case. When $\sigma$ is significant, however, the loss tangent term can be kept relatively small by having $\omega$ very large. This is the reason that microwave frequencies, i.e. frequencies in the range between about 300 MHz. and 300 GHz., are employed.

There are practical limits, however, on how high a frequency can be used in making meaningful measurements in a borehole (as described in the copending Rau application). Thus, for formations of the appreciable conductivity, the use of the highest practical frequencies may still result in a significant loss tangent which, if ignored, will lead to error in measuring the apparent value of dielectric constant. However, the measurements can be corrected for loss tangent. To visualize the correction it is helpful to represent the real and imaginary parts of the propagation constant $\gamma$ as $\beta$ and $\alpha$, respectively, so we have $$\gamma = \beta + j\alpha \quad (6)$$

where $\alpha$ is associated with wave attenuation or loss. (Note that the propagation constant is used in the wave equation in the form $e^{j\gamma}$, so the real part of the propagation constant becomes the imaginary part of the exponent and vice versa.) Squaring equations (5) and (6) and equating the real parts of each gives $$\beta^2 - \alpha^2 = \mu\epsilon\omega^2 \quad (7)$$

Now, if we take the $\beta$ of equation (5) and substitute therefor a general "corrected" value, called "$\beta_{corr.}$," which takes lossiness into account, we have $$\beta_{corr.} = \omega\sqrt{\mu\epsilon}. \quad (8)$$

From equation (7) it is seen that the appropriate value for $\beta_{corr.}$ is $$\beta_{corr.} = \sqrt{\beta^2 - \alpha^2}. \quad (9)$$

The desire for obtaining a measure of the relative phase shift and attenuation per unit distance of propagating microwave energy can now be more readily appreciated. The phase constant $\beta$ can be determined from velocity or phase measurement in accordance with relationship (1). An "uncorrected" value of $\epsilon$, valid for relatively lossless material, could then be determined from equation (4). To obtain a more accurate value of $\epsilon$, $\alpha$ can be obtained from a relative attenuation measurement and then, having $\alpha$ and $\beta$, $\beta_{corr.}$ can be calculated from equation (10). The loss-corrected value of dielectric constant can then be determined from equation (9). The equations can be manipulated and utilized in various orders, but there is a demonstrated need for basic phase and attenuation information in any event.

Referring to FIG. 1, there is shown an embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 30 is suspended in the borehold 32 on an armored cable 33, the length of which substantially determines the relative depth of the device 30. The cable is controlled by suitable means at the surface, such as a drum and winch mechanism (not shown).

The logging device 30 includes an elongated cylindrical support member 34, the interior portion of which has a fluid-tight housing containing the bulk of the downhole electronics. Mounted on support member 34 are a pair of bowed springs 35 and 36. The spring 35 has mounted thereon a pad member 37 which contains, inter alia, two vertically spaced transmitting antennas $T_1$ and $T_2$ and two spaced receiving antennas $R_1$ and $R_2$ which are positioned between the transmitters on a substantially common axis therewith. Mounted on the spring 36 is a secondary pad member 38 which may be an inactive pad that facilitates smooth vertical movement of the device 30 through the borehole. If desired, however, the pad 38 may contain electrodes or like additional means for investigating the surrounding formations. Electronic signals indicative of the information obtained by the logging device are transmitted through the cable 32 to a computing module and a recorder (not shown) located at the surface of the earth. The particular means shown in FIG. 1 for maintaining the antennas in engagement with the borehole wall is illustrative, and it will be appreciated that other suitable means for accomplishing this objective, such as hydraulic means, can be utilized.

Figure 2:
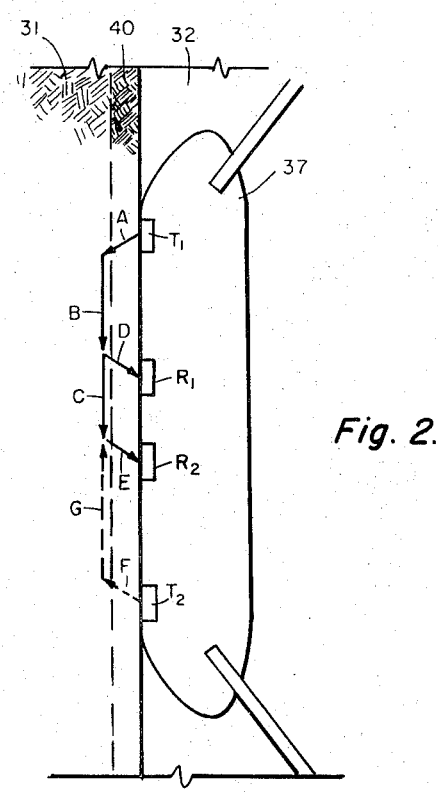
FIG. 2 illustrates a wall-engaging pad member and is helpful in understanding the nature of the electromagnetic wave to be measured by the apparatus of FIG. 1.

FIG. 2 illustrates, in simplified form, the nature of propagation of the electromagnetic wave to be measured with the apparatus of FIG. 1. In FIG. 2 the pad 37 is shown positioned against the side of the borehole 32 which, as above stated, is filled with a drilling mud. Generally, the fluid pressure in the formations traversed by a borehole is less than the hydrostatic pressure of the column of mud in the borehole, so that the mud and mud filtrate flows somewhat into the formations. The formations tend to screen the small particles suspended in the mud so that a mudcake is formed on the walls of the borehole. The thickness of the mudcake varies with formation parameters such as permeability, but at least a very thin mudcake is usually present on the borehole wall. In FIG. 2 the pad 37 contacts a mudcake 40 which is shown as being of exaggerated scale thickness for illustrative clarity. A propagating electromagnetic wave is shown as originating at the transmitter $T_1$, via arrow A, and having portions of the wave energy received at $R_1$ and $R_2$. The lateral wave, travelling in the formation adjacent the interface between the mudcake 40 and the formations 31, is represented by the arrow B and its extension, arrow C. The lateral wave continually sheds energy back through the mudcake, and the portions of energy which are shed at the approximate locations of the receivers $R_1$ and $R_2$ are represented by the arrows D and E. Considerations of required spacings and conditions necessary for the establishment of a lateral wave in the formations are disclosed in the referenced copending Rau application.

Another propagating wave is shown as originating at transmitter $T_2$, via dotted arrow F, and then travelling as a lateral wave in the direction shown by dotted arrow G. This wave will first shed some energy toward $R_2$ and then shed some energy toward $R_1$. Due to geometrical coincidence, this wave from $T_2$ will subsequently travel paths having lengths which correspond to the arrows E and C+D. The utilization of the waves originating from $T_1$ and $T_2$ will be discussed hereinafter.

Referring again to FIG. 1, the downhole electronics contained within the member 34 are shown, for convenience of illustration, in the dashed-enclosed area at the side of the borehole. A solid state oscillator 45 provides output energy in the microwave region of the spectrum. In the present embodiment the oscillator 45 operates at the suitable frequency of 1.1 GHz.; i.e., $1.1 \times 10^9$ cycles per second. The output of oscillator 45 is coupled through an isolator 46 to an electronic switch 47, the two outputs of which are coupled over coaxial lines to the tranmitting antennas $T_1$ and $T_2$. The preferred type of antennas to be used as transmitters and receivers, viz., cavity-backed slot antennas, are described in detail in the copending Rau application. The switch 47 is controlled by a signal M which is one of the two complementary outputs of a 100 Hz square wave generator 60. The square wave M, and its 180°-out-of-phase complement $\overline{M}$, are utilized to achieve synchronized operation in the present embodiment in a manner to be described. Thus, by virtue of control signal M, the transmitters $T_1$ and $T_2$ are alternately energized for 10 millisecond periods.

The receiving antennas $R_1$ and $R_2$ are respectively coupled over coaxial lines to processing channels 48 and 49, each of which includes a mixer and an amplifier in series arrangement. As set forth above, the signals which arrive at $R_1$ and $R_2$ are out of phase with each other by an amount which depends on the phase constant $\beta$ and have an amplitude ratio which depends upon the attenuation constant $\alpha$. The mixers 50 and 51 each receive, in addition to the signals from $R_1$ and $R_2$, microwave energy at a frequency that is separated from the transmitter frequency by some relatively low sub-microwave frequency. In the present embodiment, a solid state oscillator 52 supplies microwave energy to mixers 50 and 51 at a frequency of 1.1001 GHz., or 100 KHz above the transmitter frequency. The output signals 50A and 51A of the mixers 50 and 51 therefore contain the difference frequency of 100 KHz. In accordance with well known principles, the signals 50A and 51A maintain the phase and amplitude relationships of the signals received from $R_1$ and $R_2$, but the task of phase detection is greatly facilitated at the lower frequency of the mixed signals. To insure that the difference frequency between the outputs of the oscillators 45 and 52 remains at 100 KHz, the oscillator outputs are sampled and fed to a mixer 53. The output of mixer 53 is received by a frequency stabilization circuit 54 which detects drifts from the 100 KHz standard and generates a correction signal 54A which controls oscillator 52 in the manner of a conventional "phase-locked loop."

The outputs of the mixers 50 and 51 are amplified by amplifiers 56 and 57 and then each of the two channel output signals, designated 48A and 49A, are coupled to a subsystem 70 and to another sybsystem 80. The sybsystem 70 is utilized to obtain a measure of the phase difference between the signals from the channels 48 and 49. The signals 48A and 49A are respectively coupled to zero-crossing detectors 71 and 72 which have outputs of lines designated 71a and 72a. The line 71a is coupled to one input of each of two AND gates 73 and 75. The line 72a is coupled to one input of each of two other AND gates 74 and 76. The second input to the gates 73 and 74 is the signal M and the second input to the gates 75 and 76 is the signal $\overline{M}$. The outputs of gates 73 and 76 are coupled in common to the "set" input of a flip-flop 77. The outputs of gates 74 and 75 are coupled in common to the "reset" input of the flip-flop 77. The output of flip-flop 77 is received by an averager or rate circuit 78 whose output level is a function of the average phase difference between the signals 48A and 49A.

Figure 3:
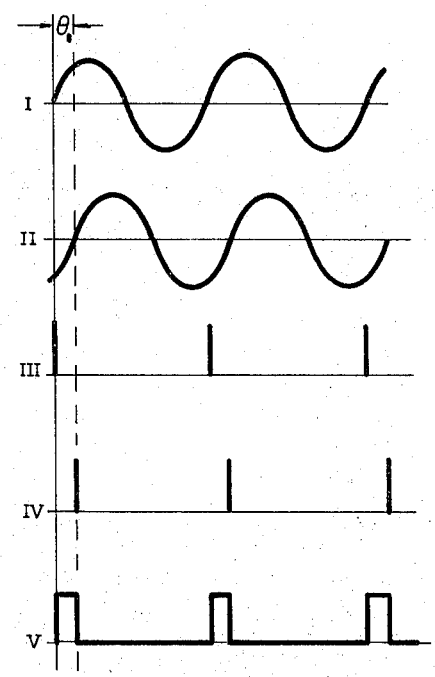
FIG. 3 shows a group of graphs which are helpful in describing the type of waveforms which occur in a subsystem of the apparatus of FIG. 1.

The operation of subsystem 70 can be described with the aid of FIG. 3 which depicts, in graphs I and II the signals 48A and 49A. Assume, for the portion of signal shown, that M is positive (or "on") so that $T_1$ is the active transmitter. In such case the propagating energy is received first at $R_1$ and then at $R_2$. This ultimately results in the signal 48A leading the signal 49A by a phase angle $\theta_1$ as shown in FIG. 3. The zero-crossing detectors 71 and 72 generate an output spike each time their inputs exhibit a positive-going zero crossing of a prescribed zero reference level. (Alternate types of detectors are also suitable, e.g. those which detect both positive-going and negative-going crossings.) The graphs III and IV show the outputs 71a and 72a. When M is "on," $\overline{M}$ is off so only the gates 73 and 74 can pass the spikes from the detectors. The output of gate 73 "sets" the flip-flop 77 whereas the output of gate 74 "resets" the flip-flop 77. Accordingly, the output of flip-flop 77, shown in graph V, is a series of pulses having widths which correspond to the phase angle $\theta_1$. The rate circuit 78 receives the pulses and generates an output level which represents the area under a number of successive pulses. The height of the pulses is fixed, so the output level of rate circuit 78 reflects the phase angle $\theta_1$.

Assume now that ten milliseconds have passed and that $\overline{M}$ is "on" and M is off. In such case $T_2$ is the active transmitter and energy will be received first at $R_2$ and then at $R_1$. Thus the signal 49A will now lead the signal 48A by a phase angle of, say, $\theta_2$. This will result in the spikes of signal 72a leading the spikes of signal 71a by a time which corresponds to the phase angle $\theta_2$. Now, however, $\overline{M}$ is "on" so only the gates 75 and 76 can pass the spikes from the detectors and this effectively reverses the "sense" of the phase comparison. The output of gate 76 "sets" the flip-flop 77 while the output of gate 75 resets it. Thus, the flip-flop 77 generates pulses having widths which relate to $\theta_2$, so that the output level of rate circuit 78 reflects the phase angle $\theta_2$.

In the preferred embodiment of the invention the time constants associated with the rate circuit 78 are selected as being sufficiently long to add the flip-flop output pulses which occur during a plurality of successive cycles of M or $\overline{M}$. The output of integrator 78 is thus a function of the averaged phase difference over the plurality of cycles; viz., the average of $\theta_1$ and $\theta_2$.

The subsystem 80 is utilized to obtain a measure of the relative attenuation as between the signals from the channels 48 and 49. The signals 48A and 49A are respectively applied to logarithmic amplifiers 81 and 82 whose outputs are, in turn, respectively coupled to the peak detectors 83 and 84. The peak detector outputs 83A and 84A are coupled through electronic switches 85 and 86 to the output conductor lines 87 and 88. The switches are controlled by M and $\overline{M}$ such that their outputs are alternately coupled to the lines 87 and 88. The synchronization is such that the signal originating from the "close" receiver is always coupled to the line 87 and the signal originating from the "far" receiver is always coupled to line 88. The lines 87 and 88 are coupled to the input terminals of a difference amplifier 89 which generates an output that is a function of the formation attenuation constant, $\alpha$. This can be visualized by representing the amplitude of the wave energy received at the "close" receiver as $Ae^{-\alpha z}$ where A is an amplitude constant and z is the distance separating the active transmitter and the close receiver. It follows that the amplitude of the wave energy received at the "far" receiver is $Ae^{-\alpha (z+L)}$ where L is the distance separating the receivers. The ratio of the wave amplitudes at the two receivers is therefore $Ae^{-\alpha (z+L)}/Ae^{-\alpha z} = e^{-\alpha L}$. The logarithm of the ratio of the wave amplitudes is therefore proportional to $\alpha$. It will be appreciated that subsystem 80 accomplishes this mathematical result by taking a difference of the logarithms of the wave amplitudes. The switches 85 and 86 act to sequentially reverse the sense of the amplitude comparison so that the inputs to the difference amplifier 89 are in the proper magnitude relationship. The output of difference amplifier 89 is coupled to an averaging circuit 90 which produces a signal level that is a function of the averaged relative attenuation over a plurality of successive cycles of M or $\overline{M}$.

In describing the operation of the apparatus of FIG. 1, assume initially that the components of the receiving circuitry are operating in a perfectly stable manner. In such case the phase angles referred to above, $\theta_1$ and $\theta_2$, are a true function of the net pathlengths between transmitter and receivers (FIG. 2) and of the phase constant $\beta$ along the paths. Thus we see that $\theta_1$ is a function of the pathlength $T_1R_2 - T_1R_1$ which, in terms of the FIG. 2 designations, is (A+B+C+E)−(A+B+D)=C+E−D. Similarly $\theta_2$ is a function of the pathlength $T_2R_1 - T_2R_2$ which, in terms of the FIG. 2 designations, is (F+G+C+D)−(F+G+E)=C+D−E. Remembering that $\theta_1$ and $\theta_2$ are effectively averaged by the subsystem 80, the cancelling of terms reveals that the average phase measured is a function of C only. Since C is a fixed length, the measured average phase yields the desired information about the phase constant of the formations. (It can be noted in this context that if D and E of FIG. 2 were identical paths, the phase angles $\theta_1$ and $\theta_2$ would be equal.) The consideration of pathlengths with respect to the attenuation measurement of subsystem 80 are the same in principle as those just set forth.

Assume next that one of the processing channels, say channel 48, introduces a small extraneous phase shift $\delta$ that is not also introduced by the corresponding processing channel 49. In such case the signal 48A will have a phase error component of $\delta$ which is not a function of the formations being examined. This phase error component will not disturb the ultimate phase determination, however, as it will be cancelled by averaging. Specifically, when M is "on" there will be an effective phase error of $+\delta$ and when M is "off" there will be an effective phase error of $-\delta$ since the sense of the phase comparison is reversed. The same type of error cancellation effect occurs for an amplitude drift in one channel or the other. In such case the periodic reversal of the sense of the comparison by subsystem 80 will tend to cancel the error.

The output levels which are representative of $\beta$ and $\alpha$ can be transmitted to the surface of the earth through the cable 32 for connection to a computing module and/or recorder or the like. It will be appreciated that there is some flexibility as to the point at which signals can be transmitted to the earth for further processing. For example, the signals on lines 87 and 88 could be transmitted to the surface for application to a difference amplifier at the surface. Most processing shown in FIG. 1 should, however, be preferably performed downhole.

The invention has been described with reference to a particular embodiment, but it will be appreciated that variations within the spirit and scope of the invention will occur to those skilled in the art. As an example, it will be understood that preamplification in the channels 48 and 49 could be provided before the mixers. The described cancellation of small errors would apply to any such additional amplifiers as it would to other matched elements such as the zero crossing detectors.

I claim:

1. Apparatus for investigating earth formations surrounding a borehole, comprising:

first and second spaced transmitter means for injecting microwave electromagnetic energy into the surrounding formations;

switching means for alternately energizing said transmitter means;

first and second spaced receiver means positioned between said transmitter means on a substantially common axis therewith;

a first processing channel including in series arrangement first frequency translating means and first amplifying means for receiving microwave signals from said first receiving means, translating the frequency of said signals to a sub-microwave frequency and amplifying said signals to produce a first processed signal;

a second processing channel including in series arrangement second frequency translating means and second amplifying means for receiving microwave signals from said second receiving means, translating the frequency of said signals to a sub-microwave frequency and amplifying said signals to produce a second processed signal; and means for comparing the phases of said first and second processed signals and for generating a first output which reflects said comparison; and means synchronized with said switching means for reversing the sense of the comparison performed by said comparing means.

2. The apparatus as defined by claim 1 further comprising means for comparing the amplitudes of said first and second processed signals and for generating a second output which reflects this amplitude comparison; and means synchronized with said switching means for reversing the sense of the amplitude comparison performed by the amplitude comparing means.

3. The apparatus as defined by claim 1 further comprising means for averaging the output of said phase comparing means over a period of a plurality of cycles of said switching means.

4. The apparatus as defined by claim 2 further comprising means for averaging the output of said phase comparing means over a period of a plurality of cycles of said switching means.

5. The apparatus as defined by claim 2 further comprising means for averaging the output of said amplitude comparing means over a period of a plurality of cycles of said switching means.

6. The apparatus as defined by claim 4 further comprising means for averaging the output of said amplitude comparing means over a period of a plurality of cycles of said switching means.

7. The apparatus as defined by claim 1 wherein said means for injecting energy into the formations includes a first oscillator operating at a first microwave frequency and wherein said apparatus further comprises a second oscillator operating at a second microwave frequency locked to said first microwave frequency, the output of said second oscillator being coupled to each of said first and second frequency translating means.

* * * * *